United States Patent [19]

Heffron

[11] Patent Number: 5,438,509
[45] Date of Patent: Aug. 1, 1995

[54] TRANSACTION PROCESSING IN A DISTRIBUTED DATA PROCESSING SYSTEM

[76] Inventor: Donald J. Heffron, 2421 Third Ave. South B-6, Minneapolis, Minn. 55404

[21] Appl. No.: 133,824

[22] Filed: Oct. 7, 1993

Related U.S. Application Data

[63] Continuation of Ser. No. 652,184, Feb. 7, 1991, abandoned.

[51] Int. Cl.⁶ .................. G06F 15/24; G06F 15/46
[52] U.S. Cl. ...................... 364/408; 364/464.01
[58] Field of Search ............ 364/401, 408, 464.01, 364/465, 466

[56] References Cited

U.S. PATENT DOCUMENTS

| | | | |
|---|---|---|---|
| 3,568,155 | 3/1971 | Abraham et al. | 395/600 |
| 3,670,310 | 6/1972 | Bharwani et al. | 395/600 |
| 4,266,271 | 5/1981 | Chamoff et al. | 364/200 |
| 4,383,298 | 5/1983 | Huff et al. | 364/403 |
| 4,445,176 | 4/1984 | Burk et al. | 395/200 |
| 4,468,750 | 8/1984 | Chamoff et al. | 364/900 |
| 4,589,069 | 5/1986 | Endo et al. | 364/405 |
| 4,623,964 | 11/1986 | Getz et al. | 364/401 |
| 4,694,396 | 9/1987 | Weisshaar et al. | 395/200 |
| 4,791,561 | 12/1988 | Huber | 364/200 |
| 4,901,237 | 2/1990 | Hikita et al. | 364/464.01 |
| 5,063,507 | 11/1991 | Lindsey et al. | 364/408 |
| 5,155,809 | 10/1992 | Baker et al. | 395/200 |
| 5,165,018 | 11/1992 | Simor | 395/200 |
| 5,187,787 | 2/1993 | Skeen et al. | 395/600 |
| 5,212,789 | 5/1993 | Rago | 395/600 |

OTHER PUBLICATIONS

Program Offering, IBM Plant Automation Communication System Program Description/Operations Manual, Program Number 5798-DRX, 1985, pp. 1–92.

*A Guide To Industrial Computer Solutions,* ©IBM Corp. 1989, pp. 24–25.

*Plant Floor Series* TM *Distributed Automated Edition* TM *General Information,* ©Copyright International Business Machines Corporation 1988, 1989.

Program Offering, *IBM Plant Automation Communication System Program Description/Operations Manual,* Program Number: 5798-DRX, First Edition, ©Copyright International Business Machines Corporation 1985.

*Primary Examiner*—Kevin A. Kriess
*Assistant Examiner*—Dennis M. Butler
*Attorney, Agent, or Firm*—Schwegman, Lundberg & Woessner

[57] ABSTRACT

A system for processing transactions and a methodology for the design of such a system for enhanced transaction processing across different computing platforms. Transaction orders and transaction data are transferred and stored within the system in a standard, hardware independent format. Data generated as part of a transaction is stored in a circular queue; orders are stored so that they can be accessed by their order number or other key attribute.

Nonvolatile memory is used extensively to increase system reliability and data integrity by reducing the chances of data loss due to a system shutdown. Data is stored to nonvolatile memory before pointers to the data are modified to eliminate problems due to pointers pointing to nonexistent data.

10 Claims, 13 Drawing Sheets

| RECORD ID | OO | OO |
|---|---|---|

*FIG. 3a*

| RECORD ID | OO | COUNT | ATTR |
|---|---|---|---|

*FIG. 3b*

| RECORD ID | LENGTH | ATTR | KEY/DATA | OO | OO |
|---|---|---|---|---|---|

*FIG. 3c*

| RECORD ID | LENGTH | ATTR | DATA | LENGTH | ATTR | DATA | OO | OO |
|---|---|---|---|---|---|---|---|---|

*FIG. 3d*

| RECORD ID | LENGTH | ATTR | KEY/DATA | OO | COUNT | ATTR |
|---|---|---|---|---|---|---|

*FIG. 3e*

| ORDER RECORD | LENGTH | ORDER NUMBER ATTR | ORDER NUMBER | OO | COUNT | ATTR |
|---|---|---|---|---|---|---|

*FIG. 3f*

CB = CYCLE BYTE
FSL = FREE SPACE LENGTH
FSO = FREE SPACE OFFSET
DLn = DATA LENGTH OF RECORDn

TRANSACTION PROCESSING IN A DISTRIBUTED DATA PROCESSING SYSTEM

This is a continuation of application Ser. No. 07/652,184, filed Feb. 7, 1991.

BACKGROUND OF THE INVENTION

1. Filed of the Invention

The present invention pertains to the field of transaction processing and more particularly, to a system for enhanced transaction processing across different computing platforms.

2. Background Information

Transaction processing system development has in the past be somewhat of an art. Diverse computing platforms running different operating systems are connected together to form a system. Software developed for these systems has been tuned to the idiosyncracies of the computing platform and, therefore, difficult to port to new platforms. In addition, since each platform uses a different approach to resource management, changes at the system level ripple through the system, creating a maintenance nightmare. An example of an application using a variety of platforms is described below.

In the world of commodities trading margins are low. Profitability for the enterprise depends on the meticulous tracking of orders and the precise measurement of the commodity to be bought or sold. In prior art systems, an order is received and then entered into an order processing computer running a database application. The order is verified and transferred to a minicomputer for execution. The minicomputer is connected via serial communication links to one or more scale controllers; the scale controllers control loading of the commodity into a carrier such as a truck.

Some time later, the truck arrives at the plant to receive the amount of the commodity requested in the order. A worker enters the order number into the scale controller and the order is retrieved from the minicomputer. The worker verifies the order, places the truck onto the scale and fills the truck. The truck driver receives a bill of lading stating the gross weight of the filled truck, the tare weight (the weight of the truck before loading) and the net weight of the commodity loaded. The scale controller also prints the transaction to a printer as required for auditing purposes. Transactions are stored to nonvolatile memory and transferred as they become available to the order processing computer for balancing of the accounts.

Programmers wishing to make changes to the system are required to learn the intricacies of operation of each computer and controller. Minor changes to items such as field length during software maintenance ripple throughout the system, making code development and verification a costly and inherently unreliable prospect.

Attempts have been made to develop processing environments which allow the connection of platforms in a seamless system. One example is the Distributed Automation Environment (DAE) promoted by International Business Machines. However, typically such an environment extends to only platforms produced and supported by that computer manufacturer. In addition, data transfers between systems are restricted to fixed length, fixed position transfers. Changes in system requirements often lead to costly or unwieldy solutions.

It is clear that there is a need for an integrated approach to efficient processing of transactions across different computer platforms. Systems designed according to this approach should be modular to allow reliable maintenance as system requirements change.

SUMMARY OF THE INVENTION

The present invention is a system for processing transactions and a methodology for the design of such a system for enhanced transaction processing across different computing platforms. Transaction orders and transaction data are transferred and stored within the system in a standard, hardware independent format. Data generated as part of a transaction is stored in a circular queue; orders are stored so that they can be accessed by their order number or other key attribute.

In another aspect of the present invention, nonvolatile memory is used extensively to increase system reliability and data integrity by reducing the chances of data loss due to a system shutdown. Data is stored to nonvolatile memory before pointers to the data are modified to eliminate problems due to pointers pointing to nonexistent data.

According to yet another aspect of the invention, keyed variable length records are stored in an index accessible by their keys.

According to yet another aspect of the invention, a system design methodology is disclosed that leads to the development of inherently modular and maintainable systems.

BRIEF DESCRIPTION OF THE DRAWINGS

FIGS. 3a-f are representations of data and command records formatted according to the present invention.

DETAILED DESCRIPTION OF THE PREFERRED EMBODIMENT

In the following detailed description of the preferred embodiment, references made to the accompanying drawings which form a part thereof, and which is shown by way of illustration a specific embodiment in which the invention may be practiced. It is to be understood that other embodiments may be utilized and structural changes may be made without departing from the scope of the present invention.

Figure 1:
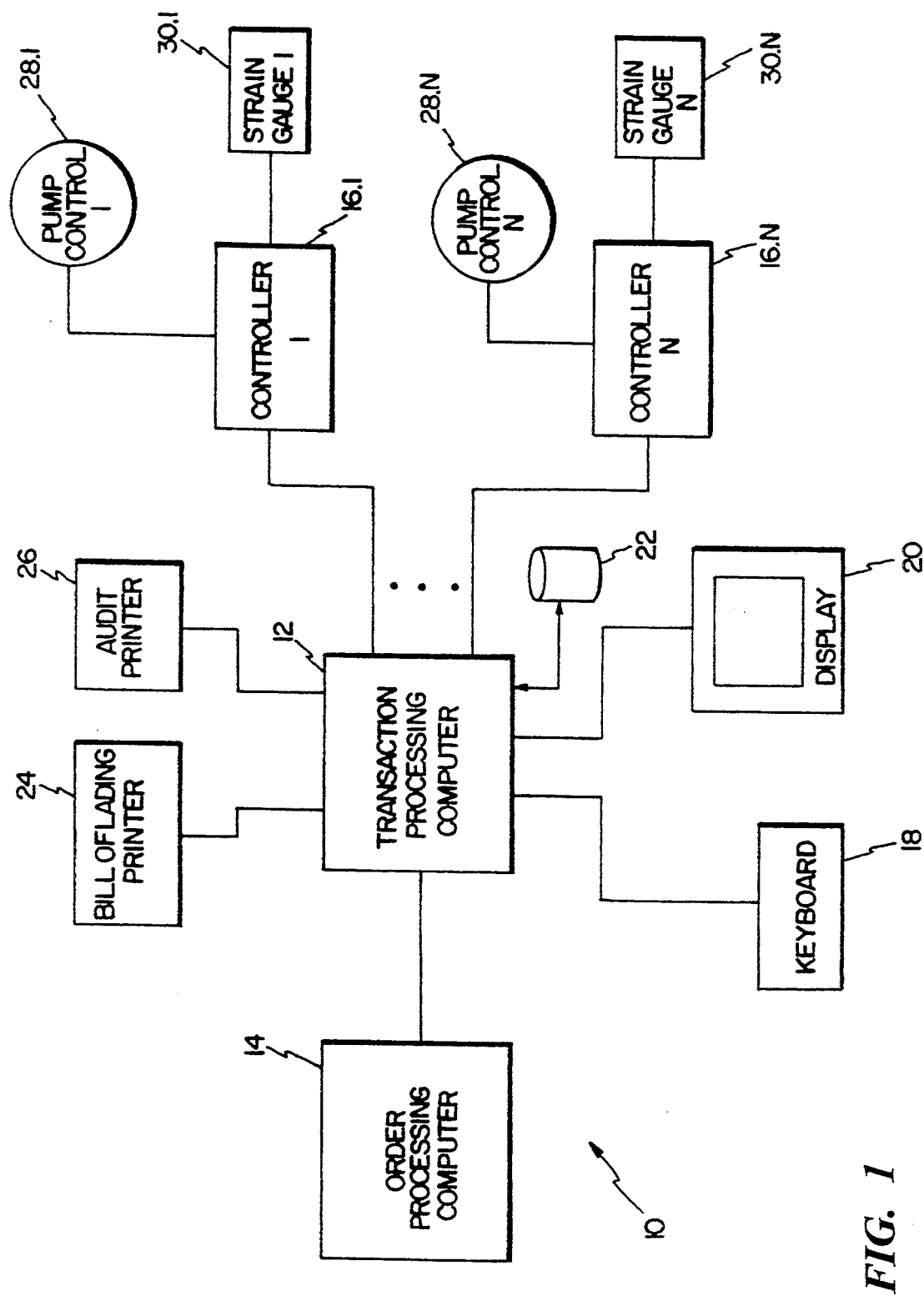
FIG. 1 is a high-level block diagram of a transaction processing system according to the present invention.

FIG. 1 illustrates a high-level block diagram of transaction processing system 10. System 10 consists of a transaction processing computer 12 connected to order processing computer 14, controllers 16.1 through 16.N, keyboard 18, display 20, nonvolatile memory device 22, printer 24 and audit printer 26. Printer 24 is used to print a bill of lading that accompanies each transaction. Audit printer 26 is used to print a record of the transaction to use as an audit trail.

Controllers 16.1 through 16.N are connected to pump control 28.1 through 28.N, respectively. Pump control 28 controls the transfer of the commodity to the carrier. Controllers 16.1 through 16.N are also connected to strain gauge 30.1 through 30.N, respectively, for monitoring the weight of commodity transferred to the carrier. Strain gauge 30 can also used to prevent filling the carrier past a prescribed limit weight.

In operation, order processing computer 14 receives an order for a certain quantity of a commodity. Computer 14 logs the order and then sends it with an identifying order number to transaction processing computer 12. Computer 12 stores the order to nonvolatile memory device 22 and waits for a request for that order number before proceeding further on filling the order.

Requests for orders are entered through keyboard 18 and displayed on display 20. Computer 12 checks the number of the order requested against a table of pending orders. If the order number matches a pending request, computer 12 retrieves the order from device 22 and sends it to the designated controller 16. Controller 16 then monitors the amount of the commodity loaded into the carrier and provides a transaction record indicating the finish of the transaction and amount of commodity transferred. This transaction record is sent to computer 12 where it is stored to nonvolatile memory device 22 and used to generate a bill of lading and an audit trail.

Transaction records stored to nonvolatile memory device 22 are stored in a queue. The least recently received transaction record stored in device 22 is transferred to order processing computer 14. There it is used to close out the order. If computer 14 is unavailable, computer 12 will continue to store new transaction records to device 22. When computer 14 becomes available, transactions are once again sent across, starting with the least recently received transaction record.

Figure 2:
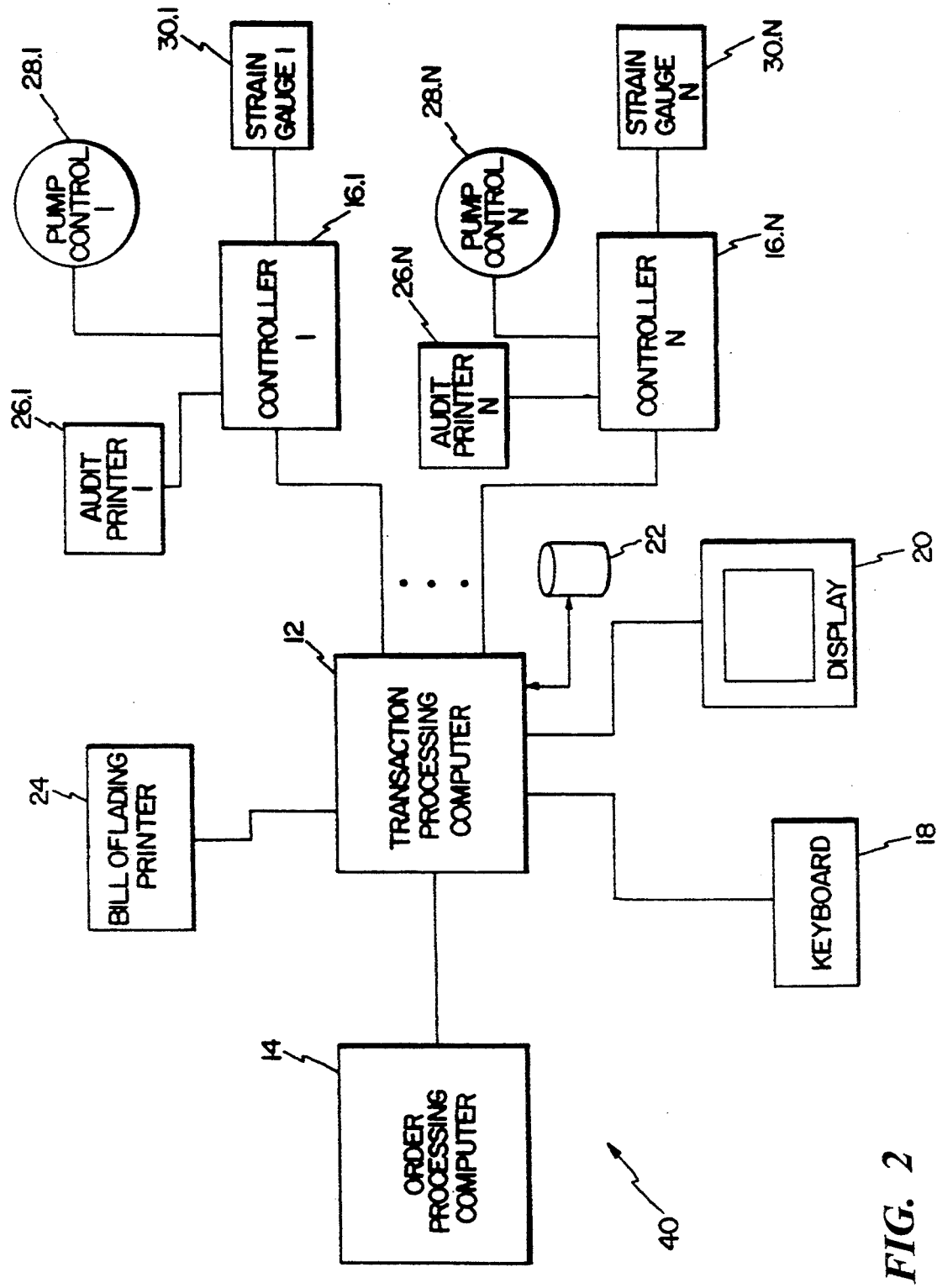
FIG. 2 is a high-level block diagram of an alternative embodiment of a transaction processing system according to the present invention.

FIG. 2 illustrates a high-level block diagram of an alternative embodiment of a transaction processing system according to the present invention. In transaction processing system 40 the audit printer 26 of system 10 is replaced by audit printers 26.1 through 26.N connected to controllers 16.1 through 16.N, respectively.

Regulatory certification requires that processors connected to an audit printer must place code relating to the conversion of a measurement to a weight and the recording of that weight to an audit printer in read only memory. In system 10, computer 12 and processors 16.1 through 16.N must be certified. In system 40, only processors 16.1 through 16.N must be certified. In this application, the controller 16 needed in system 10 can be a less complex, less expensive controller. This makes system 10 the preferred embodiment.

A design methodology is used in the development of the code to implement an application such as system 10. This methodology can be used to construct complex yet elegant transaction processing applications on small computers. This is accomplished by restricting the system developer to the use of a predefined record format in all data transfers and to the use of predefined code primitives in software design. In the preferred embodiment, these primitives are implemented as function calls. Each primitive performs a function that, when combined with the other primitives, permits the construction of a simple yet elegant transaction processing system. A class of primitives is provided for manipulating records. A second class of primitives is provided for storing records in an index. A third class of primitives stores and retrieves records from a queue. In addition, primitives are provided to handle communication between different processors in a uniform manner.

In the preferred embodiment of system 10, orders for a commodity are placed in an order record. They are then stored to an index created in nonvolatile memory 22 where they can be access by a key such as an order number. They remain in the index until requested at keyboard 18.

To process an order, a worker enters an order number at keyboard 18. Computer 12 retrieves the order record associated with the order number, it is verified by the worker and the transaction is executed. Weights related to the commodity transferred and other transaction status are placed into a data record and stored to a queue created in nonvolatile memory 22. Records are stored to the queue in order of arrival. Once the record is stored to the queue, computer 12 attempts to transfer the stored record to computer 14. If computer 14 is busy or otherwise unavailable computer 12 will continue processing orders and storing records associated with those orders to the queue. When computer 14 becomes available, computer 12 transfers records in the order of storage to computer 14.

In the preferred embodiment, communications software primitives on computer 12 and computer 14 are used to transfer an order record from computer 14 to computer 12. A record processing primitive on computer 12 is used to scan the record to determine that it is an order record. An index access primitive on computer 12 is used to save the record into the index and to retrieve it some time later. Communications primitives on computer 12 and processors 16.1 through 16.N are used to transfer the order record to a controller 16. A record processing primitive on controller 16 is used to scan the order record in order to execute the order. Communications primitives on computer 12 and processors 16.1 through 16.N are used to transfer the data records generated as the result of a transaction from a controller 16 to computer 12. A direct data access primitive on computer 12 is used to save the data record to a queue, to maintain the queue and to coordinate the retrieval and transfer of data records from the queue. And communications primitives on computer 12 and computer 14 are used to transfer retrieved data records from computer 12 to computer 14.

Figure 10:
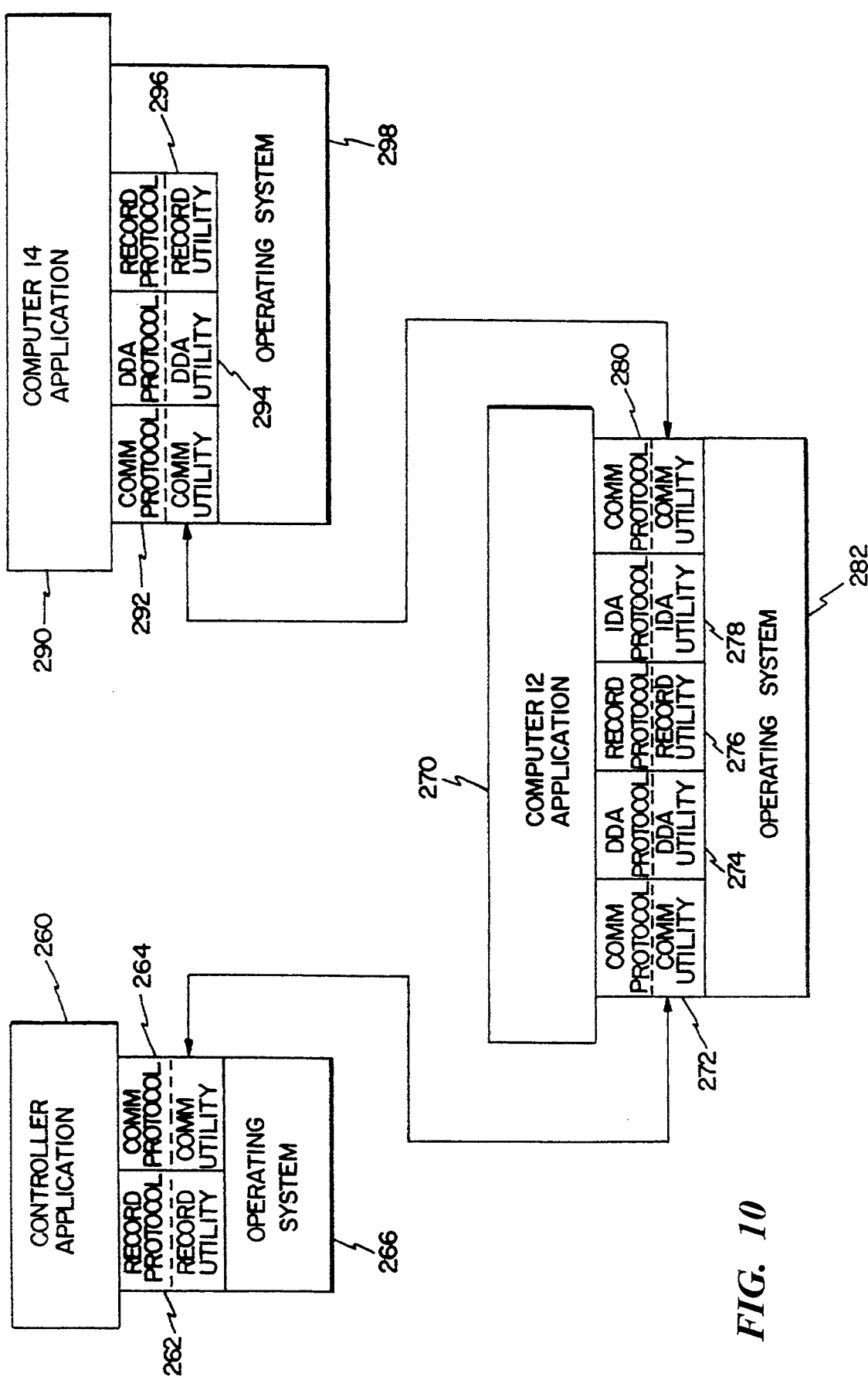
FIG. 10 is a high-level diagram of the software architecture for a processing system according to the present invention.

The primitives are tied together at the application level using application code. The use of these primitives to insulate the system designer from the hardware is illustrated in FIG. 10. In FIG. 10, controller application code 260 is separated from the operating system 266 by record manipulation primitive 262 and communications primitive 264. The interface from code 260 to primitive 262 and primitive 264 is kept static. Primitives are segmented into a protocol level and a utility level. Code at the protocol level is written in a high level language. Code at the utility level can be written in any level language. In the preferred embodiment, code at the protocol level is written in "C". Code at the utility level is written in assembly language for increased processing speed.

All accesses to controller resources are filtered through either primitive 262 or primitive 264. Changes in controller hardware are hidden from the application code by appropriate changes at the driver and, possibly, protocol level.

In a like manner, application code 270 for computer 12 is insulated from operating system 282 and therefore, its hardware platform by communications primitive 272, direct data access primitive 274, record manipulation primitive 276, index data access primitive 278 and communications primitive 280. These primitives provide all the necessary functions required to build a complex transaction processing system on computer 12.

Finally, in FIG. 10, application code 290 for computer 14 uses communications primitive 292, direct data access primitive 294 and record manipulation primitive 296 to communicate and transfer data to and from computer 12. Code 290 also is shown directly accessing system resources for other application functions. This can be done according to the present invention. However, it is risky because it does tie the application more closely to a hardware platform.

In code developed according to the present invention, the application interface to a primitive is static. Therefore, primitives can be adapted to new hardware platforms without impacting the application code. A computer or controller can be replaced with a different computer or controller and, as long as the new system has the proper compilers, the application code remains unchanged. Changes are only required at the primitive level.

In a like manner, since the primitives are static, changes in application code are limited in their ripple effect. The basic structure of the code still contains tested code. Only the new application code must be tested. The result is a system design that is modular both in hardware and software design and is more easily maintained in the face of changing hardware requirements.

In the preferred embodiment of the present invention the communications hardware is implemented as RS-232 direct connections using a serial communications protocol as described in the American National Standard (ANSI) specification X3.28-1976.

Alternatively, any communications medium could be used. It is up to the system designer to choose the appropriate medium. The choice of medium should not affect the interface to the application code.

The fundamental data structure in a system implemented according to the present invention is a record. The record is a string of data starting with a record identifier identifying the type of record and proceeding with sets of attributes with data and sets of attributes without data (trailing attributes or attribute-only fields) as required. The record identifier can be used to select a software routine to process the record or for routing. Specific data fields are defined by specific attribute codes. Data can therefore be located by the appropriate attribute code.

The format of a record is not rigidly "fixed" beyond the record identifier, but does have a logical order. The record identifier is the first field in the record. The next field is the field length of the first attribute with data. If there is no data in this record, this field length is set to zero.

A record can have more than one attribute with data. The string of attributes with data must be followed by a terminating field length of zero. This permits the construction of long strings of variable length data identified by their attributes.

Attributes with data can be followed by attribute-only fields. A count field is appended to the record string after the terminating field length of zero. This count indicates the number of attribute-only fields in the record. If there are no trailing attributes this count is set to zero.

The length of the record identifier, the attribute, the field length and the count are determined by the system designer. In the preferred embodiment, the length of the record identifier is two bytes, the length of the attribute field is two bytes and the field length and count fields are one byte each. All data, attributes and lengths are stored in a machine independent fashion.

The record identifier and attributes provide hooks for the definition, processing and routing of information. The use of the attribute fields means that data is not fixed to a specific position in the record. Also, since in the record format the length of a data field is stored with the attribute, data length is easily modified. This facilitates change, as neither the position of data nor its length is fixed for a specific data field in an application.

Some different examples using the record format are shown in FIGS. 3a–f. FIG. 3a illustrates the simplest of the records. It consists of only a record identifier. The field length and the count field are both set to zero. This type of record is useful for sending set commands or triggers.

FIG. 3b illustrates a record with no data. One or more trailing attributes are attached to the record to further define the record. This type of record is useful for sending commands with modifiers or for sending status.

FIG. 3c illustrates a record with data. An attribute with data is provided. Note the first 00 terminating the attribute with data field and the second 00 stating that there are no trailing attributes. This type of record is useful for sending data between processors. It could also be used to send an identifier with the record for use in later retrieving the record.

FIG. 3d illustrates a record with more than one string of data. Two different attributes are provided, both with data. This type of record is useful for sending records containing different types of data between processors.

FIG. 3e illustrates a record with both data and one or more trailing attributes. An attribute with data is provided. This type of record is useful for sending data with modifiers, for sending commands containing variables or for sending status with data between processors.

The use of the record format frees the application from a fixed position or fixed data length data format. Data processing applications integrating this format into their data transfer protocols significantly relax the constraint of fixed data length and position.

In the preferred embodiment, commodity orders are formatted in the record format. They include an order number or identifier in an attribute with data field. A representative order is illustrated in FIG. 3f. The order illustrated is simply an example. In the preferred embodiment, an order record is a much more complex record including a customer name field, three or more address fields and the amount of commodity needed.

The use of a record as the fundamental data structure simplifies the transfer of data. By applying this method, data need only be defined at the record identifier level and record identification need only be established once during system design. This method goes beyond quantitative and descriptive data identification (i.e. dollar amounts, part numbers and descriptions). Events, application specific commands, information requests and responses may be defined as records.

Figure 4A:
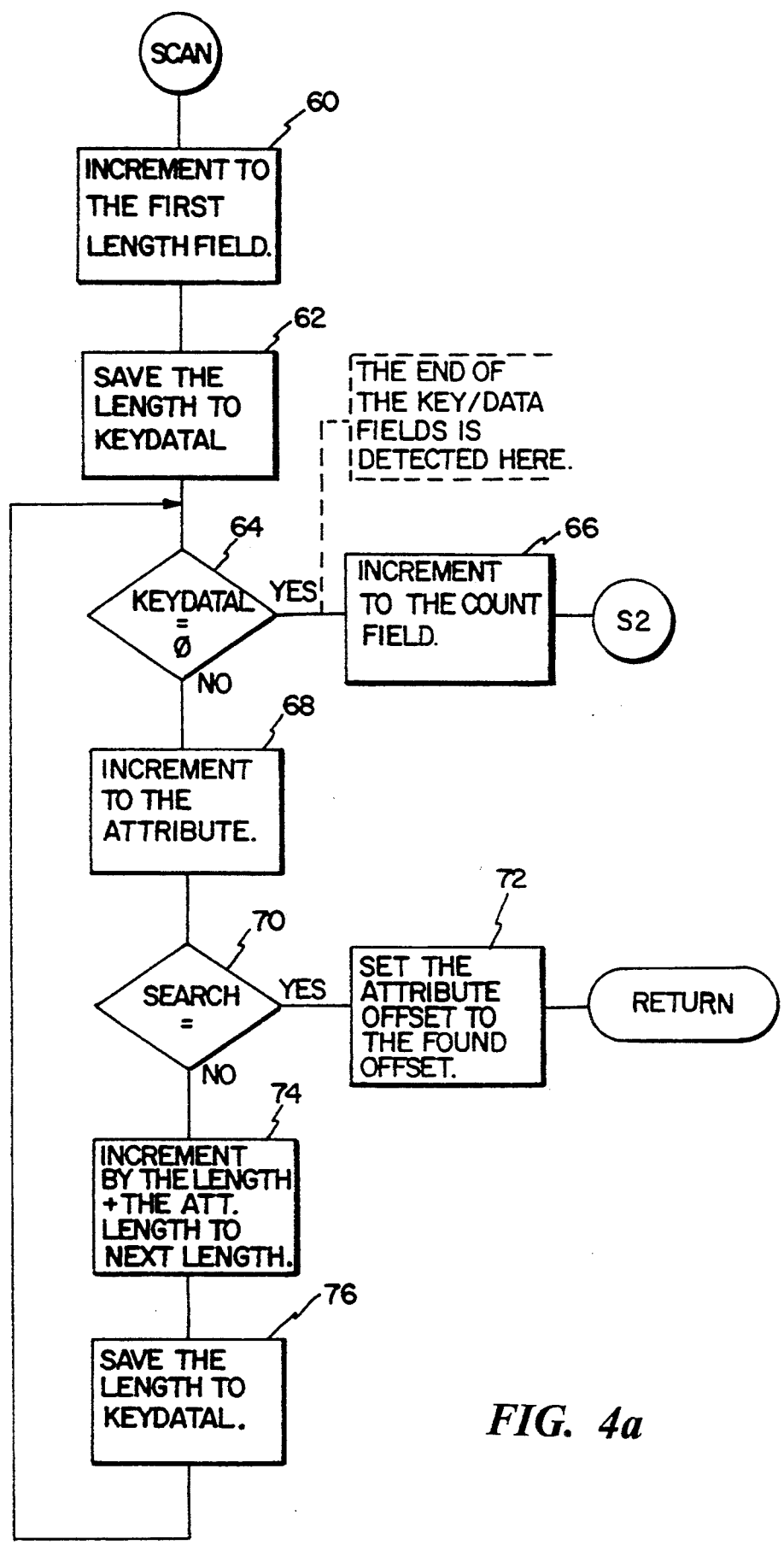
FIGS. 4a and 4b are flow diagrams representative of the steps a computer goes through in scanning a record according to the present invention.
Figure 4B:
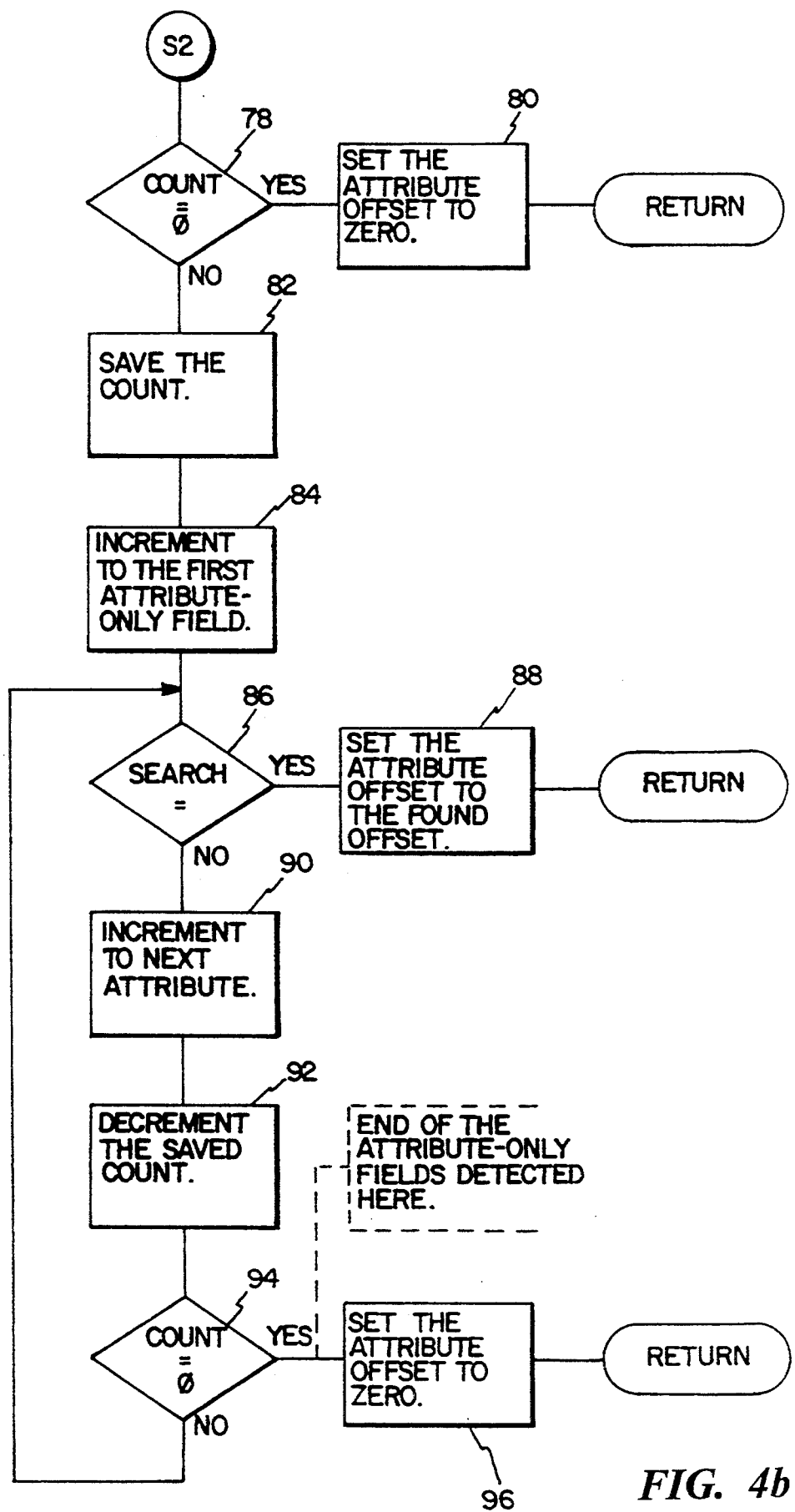

In the preferred embodiment, a group of record manipulation primitives are provided to build a record and retrieve specific information from a record. FIGS. 4a and 4b illustrate the steps a computer or controller goes through in scanning a record for a specific attribute in order to extract data from its data field. A single attribute is located per scan. That attribute location may then be used by the application code to extract data from that data field. This simplifies design of the primitive.

The fundamental scanning method makes use of the length and count fields to scan a record. In the preferred embodiment, several function calls use this method to locate attributes or to make lengths and attribute offsets known to an application. The program starts at the label "SCAN" and it is assumed that a function call has been made to locate an attribute. This function requires that the scan start at the beginning of the record or at the record identifier. At 60 an offset index into the record is incremented past the record identifier and points to the first length field.

At 62, the length is saved and at 64 the length is compared to zero. If the length is zero, the end of the key/data fields has been reached. At 66 the offset index into the record is incremented to the count field. The count field follows a zero length field. The logic is then directed to label "S2" of FIG. 4b.

If the length is not zero, at 68 the offset index is incremented to point to the attribute. The attribute follows the length in the key/data fields. At 70 a check is made to determine if the attribute pointed to by the offset index matches the attribute passed in the function call. If the attributes match, at 72 the attribute offset index is set to the offset of the found attribute in the record. The application now has access to the length of the key/data field and the location of the attribute. The function then returns to the application. In the preferred embodiment, a function was written that adjusts the attribute offset to point to the key/data field of interest if the attribute is found. This is not shown in the flow diagram.

If the attributes do not match, at 74 the index offset is incremented by the previously saved length and the length of the attribute field. The index offset now points to the next length field and at 76 it is saved. The logic then loops back to 64 to compare the saved length to zero.

At 78 of FIG. 4b the logic compares the count field to zero and if it is determined to be zero the end of the record has been reached. Then, at 80, the attribute offset index is set to zero indicating to the application that the attribute was not found. The function then returns from the call.

If the count is not equal to zero, one or more attribute-only fields exist and at 82 the count is saved. At 84 the index offset is incremented to the first attribute-only field. At 86 a check is then made to determine if the attribute pointed to by the offset index matches the attribute passed in the function call.

If the attributes match at 88 the attribute offset index is set to the offset of the found attribute in the record. This indicates to the application that the attribute does exist. The function then returns from the call.

If the attributes do not match, at 90 the index offset is incremented to the next attribute-only field and at 92 the saved count is decremented by one. At 94 the count is compared to zero. If the count is zero, the end of the attribute only fields has been reached and at 96 the attribute offset is set to zero indicating to the application that the attribute was not found. The function then returns from the call.

If the count is not zero, the logic loops back to 86 to again compare the attributes.

In the preferred embodiment, other record manipulation primitives are available for building a record. A function call is provided to start the build of a record by placing a record identifier into a memory buffer. A second function call is used to add length and attribute fields to a record in the buffer. This would be followed by a third function to move a field of data into a record. Then, to add one or more attribute-only field or to end the record, a fourth function call is provided. This function call appends a length field of zero, a count field and the attribute fields. It can also end the record by appending a length field of zero and a count field of zero if the record is to end with no attribute-only fields.

A fundamental approach to design in this methodology is the use of nonvolatile memory for preserving the integrity of records. Two different approaches to nonvolatile data storage are used. One is called the Direct Data Access Method. The second is called the Index Access Method.

The Direct Data Access Method is used to store and retrieve records from a queue. This makes this method useful in the capturing of data and the storing of records in time of arrival order.

The Index Access Method is used to store records so that they can be easily located through the use of a key field. This method is useful in creating indices of records for such things as orders or for creating record-lookup tables.

Direct Data Access (DDA) primitives are used to build and access a data file from its beginning to end sequentially. The logical beginning and end of the file are dynamic such that the data file is used in a circular fashion or perpetually. All data written to the file are by order of arrival and all data retrieved from the file are by order of arrival.

DDA primitives are responsible for directing access to the physical beginning of the file when the physical end of the file is detected. They are is also responsible for maintaining the logical beginning and end of file pointers such that data is not over-written or over-read.

In the DDA method, all data blocks are fixed to a specified length on a per file basis. The method provides for variable length records provided the record length is within the specified block size. In the method, only the currently accessed data block is held in memory, keeping memory requirements for the method at a minimum. The memory image is written to disk on each addition of a record to the data block. This assists to provide reliable storage of data.

In the preferred embodiment, a function is provided for storing the relative block and record number in a data record. This is significant in keeping two systems in lock step when transferring data. To keep two systems in lock step, the system capturing the data will store the relative block and record numbers with each data record. Data collection, codification and storage can occur, then the memory image of the data record can be transferred to another system. It is the responsibility of the receiving system to store the data as it is received. When the communications or transfer medium is not available data storage can continue on the first system.

The systems can be programmed such that when the state of the communication medium is restored, the first system requests the last relative block and record numbers that the second system received. Then the first system directs the method to transfer all records that it may have collected from that point on.

Periodically during normal transfer, the first system can request the last relative block and record pointers that the second system has received. This is in essence how the logical beginning and end of file pointers are maintained. With this method and appropriate programming, data collection, storage transfer and basic file maintenance can occur without human intervention.

With appropriate file data structure addressing more than one direct access file can be utilized in an application. A file write is permitted during a read of the file. This is to provide continued data storage capability.

A file is allocated and formatted for use as a Direct Data Access Method file. The specifications for allocation are described below.

Disk sector size: This is generally the smallest subdivision of a disk file that the operating system will read or write. The file allocation is based on multiples of the sector size.

Size of the data block: This is the size of a data block in bytes, based upon the perceived application requirement. The size of each data block will be rounded up to multiples of the sector size. All data blocks are allocated to the same size for a specified file.

Number of data blocks: This is the total number of data blocks that the file will hold based upon the perceived application requirement.

From the above specifications the size of the file is determined. The block size is rounded up to a multiple of the given sector size. The total space required for data blocks is the block size times the number of given data blocks.

In addition to the data blocks a header record is required for each file. This header record is allocated as the size of one sector. The total byte size of the file is a summation of the above.

Figure 6:
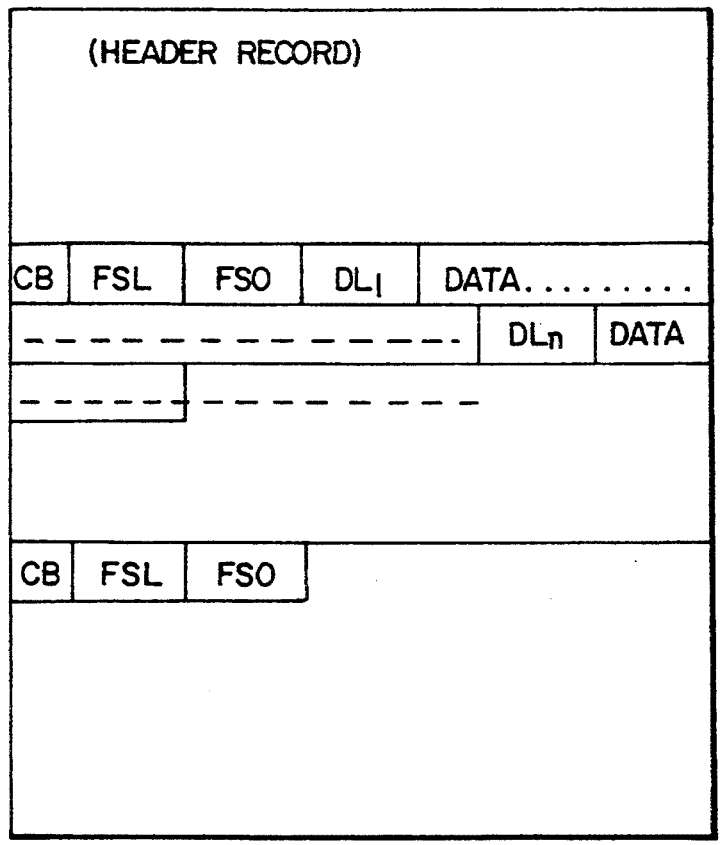
FIG. 6 is a diagram of a direct data access file according to the present invention.

When the file is created the data blocks are initialized to binary zeros and control information placed at the beginning of each block. A given file can be represented by the diagram illustrated in FIG. 6. In the preferred embodiment, the file header record contains the file specifications information and is formatted as follows:

Two byte unsigned integer for the last relative block read;
Two byte unsigned integer for the last relative record read;
Two byte unsigned integer for the sector size in bytes;
Two byte unsigned integer for the header record size in bytes;
Two byte unsigned integer for the data block size in bytes;
Two byte unsigned integer for the number of data blocks in the file;
Two byte unsigned integer for the file full flag;
Two byte unsigned integer for optional application identification;
Seven byte field for the file creation date stored as unsigned hexadecimal values (YYYYMMDDHHMMSS);
Open space for the remainder of the header record.

In the preferred embodiment, a data block is formatted as follows:
One byte unsigned for the cycle byte;
Two byte unsigned integer for the free space length in bytes;
Two byte unsigned integer for the free space offset in the data block;
Open space for the remainder of the data block.

Due to the detail and complexity of the Direct Data Access Method, data structure variables will be referenced by their declared symbolic name.

The "ddam_head" structure holds the values from the file header record. The "ddam_head" structure is referenced by prefixing "hd->" to a specific structure variable name (e.g. hd->hdsz).

```
struct ddam_head {
    USHORT rbn;
    USHORT rrn;
    USHORT secsz;
    USHORT hdsz;
    USHORT blksz;
    USHORT blkn;
    USHORT full;
    USHORT sysid;
    UCHAR create[7];
    UCHAR opn[512];
};
```

"hd->rbn" is used to hold the last relative block number read from the file. This value in the header record is initialized to binary ones at file allocation, indicating a "null file".

"hd->rrn" is used to hold the last relative record number read from the file. This value in the header record is initialized to binary ones at file allocation, indicating a "null file".

"hd->secsz" is used to hold the disk sector size for a specified file.

"hd->hdsz" is used to hold the header record size in bytes.

"hd->blksz" is used to hold the data block size in bytes.

"hd->blkn" is used to hold the total number of data blocks in a specified file. This value is used to assist in determining a wrap condition where the file must be pointed back to the first data block.

"hd->full" is used as a flag to indicate that the file is full and data writing is not permitted. This flag can be set to the "full" indication during a write to the file and set to a "not full" indication after records have been retrieved from the file.

"hd->sysid" is used to optionally hold an application identification.

"hd->create" is used to hold the file creation date. This date is applied to the header record when the file is allocated and formatted.

"hd->opn" is the start of the remaining open space in the header record. It is defined in the structure as 512 bytes but this value will be dynamic based upon the specified header size. It is of interest only to read the first 512 bytes of the header into memory and assures the application of at least 512 bytes for the header record.

The "ddam_calc" structure is used to hold calculated values during positioning, reading and write processing of the file. This structure can also optionally hold the last relative block and record numbers received from another application. The "ddam_calc" structure is referenced by prefixing "calc->" to a specific structure variable name (e.g. calc->first).

```
struct ddam_calc {
    USHORT rbn;-
    USHORT rrn;
    USHORT first;
    USHORT last;
    UCHAR cycle;
    USHORT from_rbn;
    USHORT from_rrn;
};
```

"calc->rbn" is used to hold the calculated relative block number of the file. The calculated relative block number addresses the data block that will be written to disk when the next record is added to the file. This is the dynamic logical beginning of the file. This value is established during application initialization when the file is positioned and updated as required during a write to the file.

"calc->rrn" is used to hold the calculated relative record number within the relative data block described above. The calculated relative record number addresses the next position in the data block that will be used when the next record is added to the file.

"calc->first" is used to hold the first relative block number of the file. Relative block and record numbering start at zero.

"calc->last" is used to hold the relative block number of the last block read during file positioning. This value is used to assist in the determination of the dynamic logical beginning of the file.

calc->cycle" is used to hold the current cycle byte comparison value. This value is used to assist in the determination of the dynamic beginning of the file.

"calc->from rbn" is used to hold the relative block number contained in a record received from another application. This value is used to keep two Direct Data Access Method files in lock step with each other.

"calc->from_rrn" is used to hold the relative record number contained in a record received from another application. This value is also used to keep two Direct Data Access Method files in lock step with each other.

The "ddam_blk" data structure is used to hold memory address pointers to the file header buffer and the data block memory buffer reserved for writing. These pointers are used during positioning and write processing of the file. The "ddam_blk" structure is referenced by prefixing "db->" to a specific structure variable name (e.g. db->fsl).

```
struct ddam_blk {
    USHORT *hd;
    UCHAR *cb;
    UCHAR *fsl;
    UCHAR *fso;
```

```
};
```

"db->hd" is a memory address pointer to the file header memory buffer. This address is established at file access initialization.

"db->cb" is a memory address pointer to the cycle byte position of the file data block memory buffer reserved for writing. This address is established at file access initialization.

db->fsl" is a memory address pointer to the free space length value of the file data block memory buffer reserved for writing. This address is established at file access initialization.

"db->fso" is a memory address pointer to the free space offset value of the file data block memory buffer reserved for writing. This address is established at file access initialization.

The "ddam_blkg" data structure is used to hold memory address pointers to the file header and the data block memory buffer reserved for reading. These pointers are used during read processing of the file. The "ddam_blkg" structure is referenced by prefixing "dbg->" to a specific structure variable name (e.g. dbg->cb).

```
struct ddam_blkg {
    USHORT *hd;
    UCHAR *cb;
    UCHAR *fsl;
    UCHAR *fso;
};
```

"dbg->hd" is a memory address pointer to the file header memory buffer. This address is established the file access initialization.

"dbg->cb" is a memory address pointer to the cycle byte position of the file data block memory buffer reserved for reading . This address is established at file access initialization.

"dbg->fsl" is a memory address pointer to the free space length value of the file data block memory buffer reserved for reading. This address is established at file access initialization.

dbg->fso" is a memory address pointer to the free space offset value of the file data block memory buffer reserved for reading. This address is established at file access initialization.

The "ddam_get" structure is used to hold values required during read processing. The "ddam_get" structure is referenced by prefixing "getx->" to a specific structure variable name (e.g. getx->flag).

```
struct ddam_get {
    USHORT rbn;
    USHORT rrn;
    USHORT flag;
    USHORT w_flag;
    USHORT lnth;
    UCHAR *addr;
};
```

"getx->rbn" is used to hold the relative block number for the next read. This value is established and updated during read processing.

"getx->rrn" is used to hold the relative record number for the next read. This value is established and updated during read processing.

"getx->flag" is used to indicate the status of read processing. This value is defined as zero at initialization, updated to "IDAM_GET_STARTED" on the first call to the get routine and updated to "IDAM_GET_COMPLETE" when the get processing is complete.

"getx->w_flag is used by the write and read processing routines only if a write occurs to a data block that is currently being read.

"getx->lnth" is used to store the length of the data record during read processing.

"getx->addr" is an address pointer to the data record in the block and is updated during read processing.

At file allocation all cycle bytes are initialized to binary zeros and the header record fields for the relative block and record numbers are initialized to binary ones. This indicates a "null file" with no data records. A Direct Data Access file is considered "null" until two conditions are met. The first, records must be written to the file and the second, records must have been retrieved from the file. The file remains "null" when only records have been written.

At file initialization the logical and physical beginning and end of the file are the same. The logical beginning and end change as records are written and retrieved from the file.

The cycle byte is used to assist in calculating the next relative block number that may be used for the next write to the file. It is one of the values that determine the dynamic logical beginning and end of the file. It is inverted when the first write to the data block occurs. The relative position of a data block in the file where the cycle byte changes is of interest. The value of binary zeros or binary ones is significant only to detect the change.

At application program initialization the first 512 bytes of the file header record are read into a temporary buffer and the file specification information is accessed to dynamically allocate system memory for the file processing. Specifically, the initialization for file processing is as follows. The file is opened and the actual size of the header record is determined from the first 512 bytes of the header record. Memory is then dynamically allocated and the address is stored in the address pointer to the file header record in memory. The total header record is read into that memory.

The size of a data block is determined from the header record, memory dynamically allocated for both the read and write data block storage. The addresses of those memory locations are stored in the appropriate structures described above.

Figure 9A:
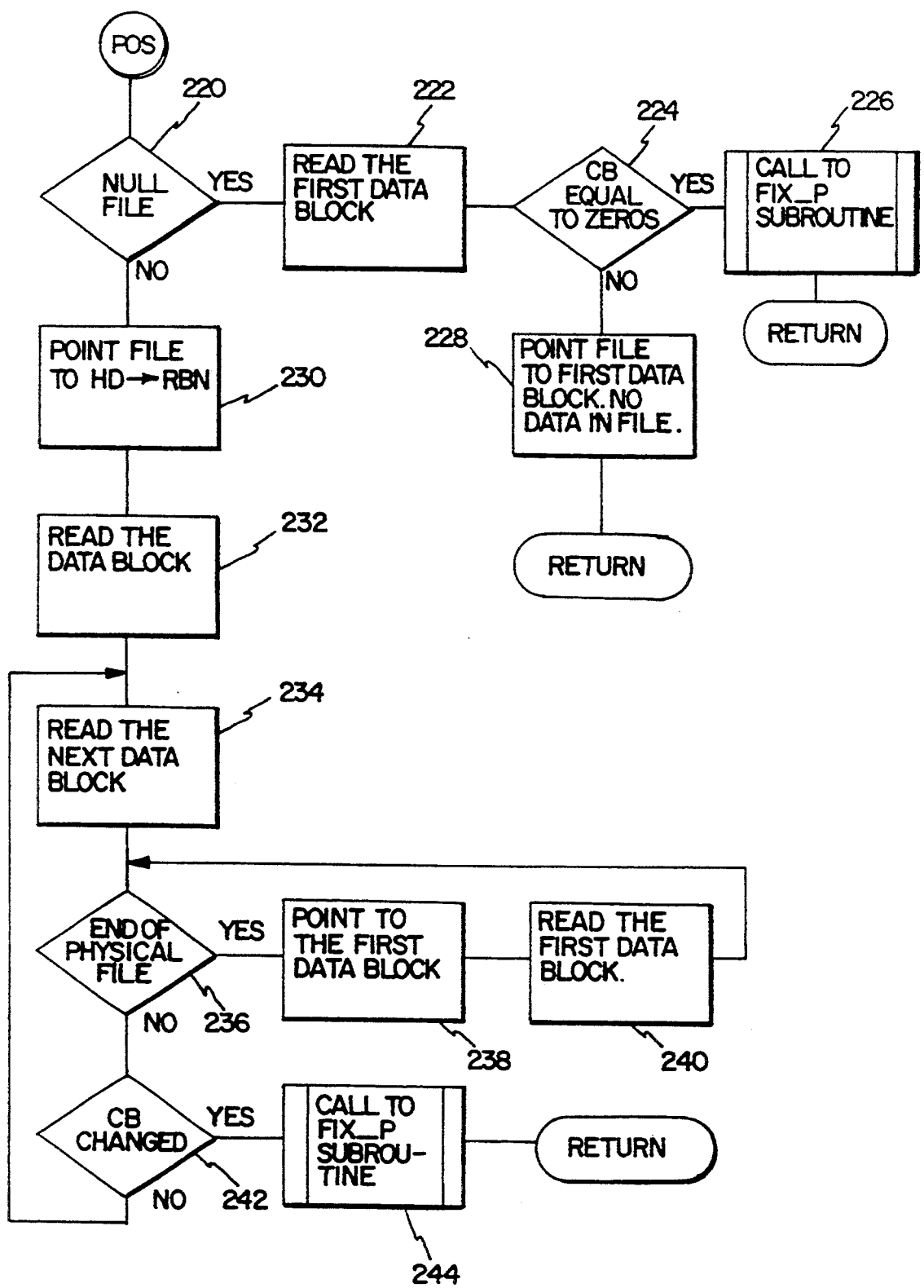
FIGS. 9a and 9b are flow diagrams representative of the steps a computer goes through in positioning the direct data access file at program startup according to the present invention.
Figure 9B:
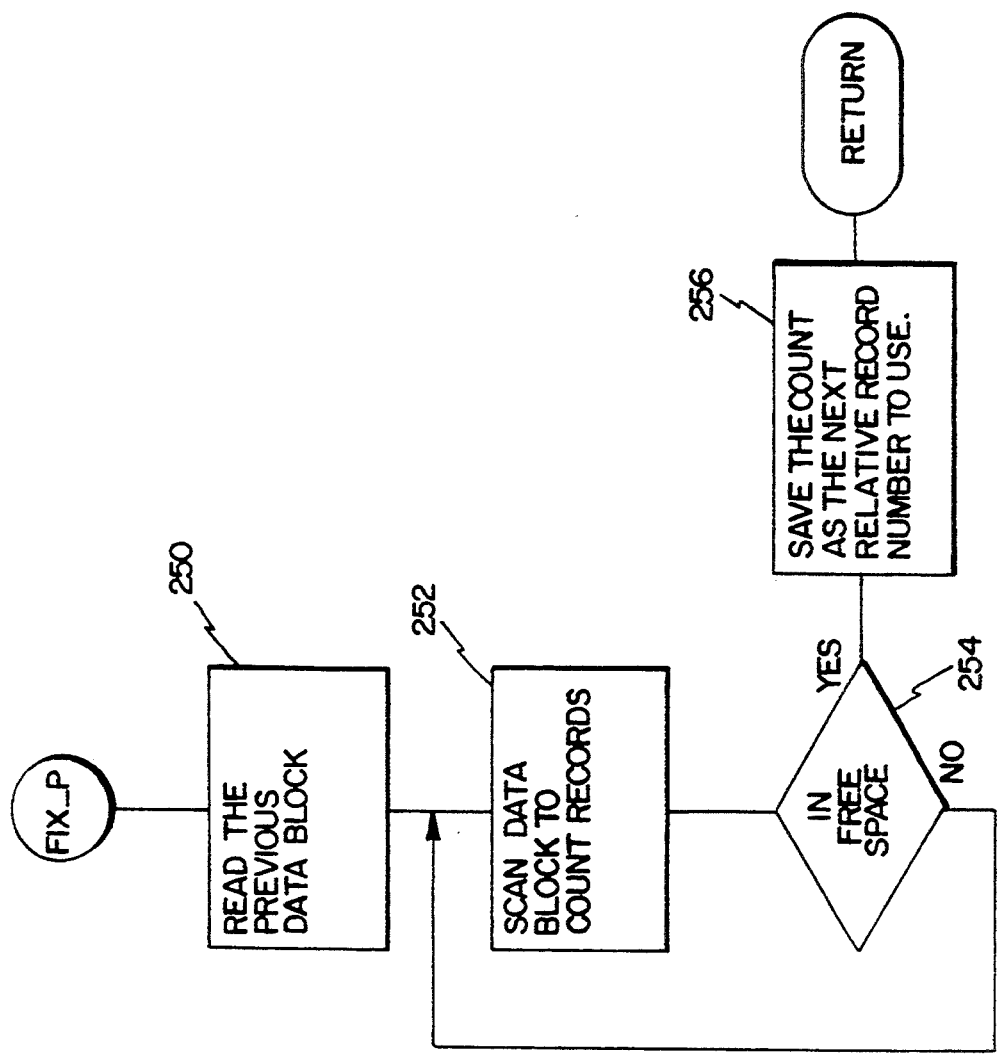

The "C" functions, "ddam_inth", "ddam_intp" and "ddam_intg" perform the file access initialization and the "C" function "ddam_finish" releases the allocated memory at the end of the application. The file is then positioned to determine the next available relative block and record for write processing. The "C" function "ddam_pos" is used to position the file and is illustrated in FIGS. 9a and 9b. The flow is described as follows.

At 220 "hd->rbn" is checked to determine if the file is "null". A "null file" indicates first, that no records have been read from the file and second that records may not have been written to the file. If at 220 the file is determined to be "null" at 222 the first data block is read into memory and at 224 the cycle byte is examined to determine if it is binary zeros. If at 224 the cycle byte is binary zeros, at 226 the routine "fix_p" is called to set the calculated relative block and record numbers ("fix_p" is described later). This condition indicates both that no records have been written and no records retrieved. Otherwise at 228 the routine has determined that there are no records in the block and points the file to the first data block. In either case, the routine then returns control to the calling routine.

If the file is determined at 220 not to be "null", (records have been written and retrieved indicated by "hd->rbn" not being all binary ones) at 230 the file is pointed to the relative block number contained in "hd->rbn". This value is stored in the header record and is the pointer to the last data block that was read or retrieved from the file. This is the relative block of the logical beginning of the file.

At 232 the data block is read into memory and the cycle byte value saved. At 234 the next sequential data block is read into memory. If at 236 this data block read detects the end of the physical file, at 238 the file is pointed to the first data block and at 240 the first data block is read into memory.

If at 236 the end of the physical file is not detected, the routine at 242 determines if any data records have been written beyond the logical beginning of the file. This is done by looking for a transition in the value of the cycle byte from one block to the next block. This is accomplished by checking the cycle byte to determine if it is the inversion of the cycle byte saved on the first data block read. If at 242 the cycle byte is not different from the cycle byte saved on the first data block read, the routine moves to 234. The routine continues to move through the data blocks until it detects the transition.

When at 242 the transition is detected, the file is now pointing one block beyond the last block that had data written to it. A call to the routine "fix_p" is executed.

The routine "fix_p" is illustrated in FIG. 9b. At 250 the routine "fix_p" points the file back to the last relative data block read or "calc->last". At 252 the data block is read into memory and scanned to determine "calc->rrn". This is the next relative record number to be used for that block. Its location is in the free space of the block. "calc->rbn" is then set to "calc->last". The file is now considered "positioned", such that the next relative block and record numbers (for a write) are known to the method.

Figure 7A:
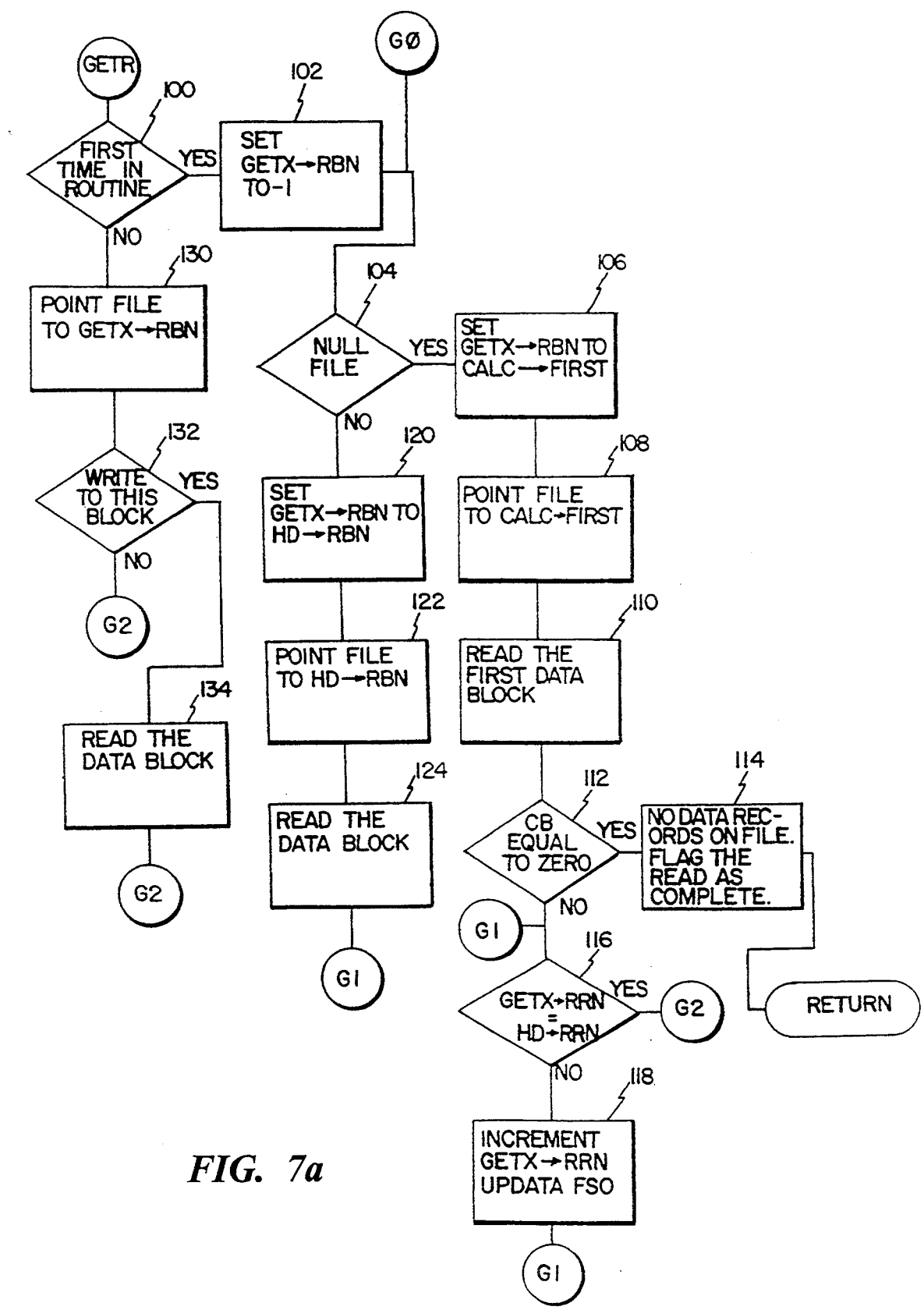
FIGS. 7a and 7b are flow diagrams representative of the steps a computer goes through in reading from a direct data access file according to the present invention.
Figure 7B:
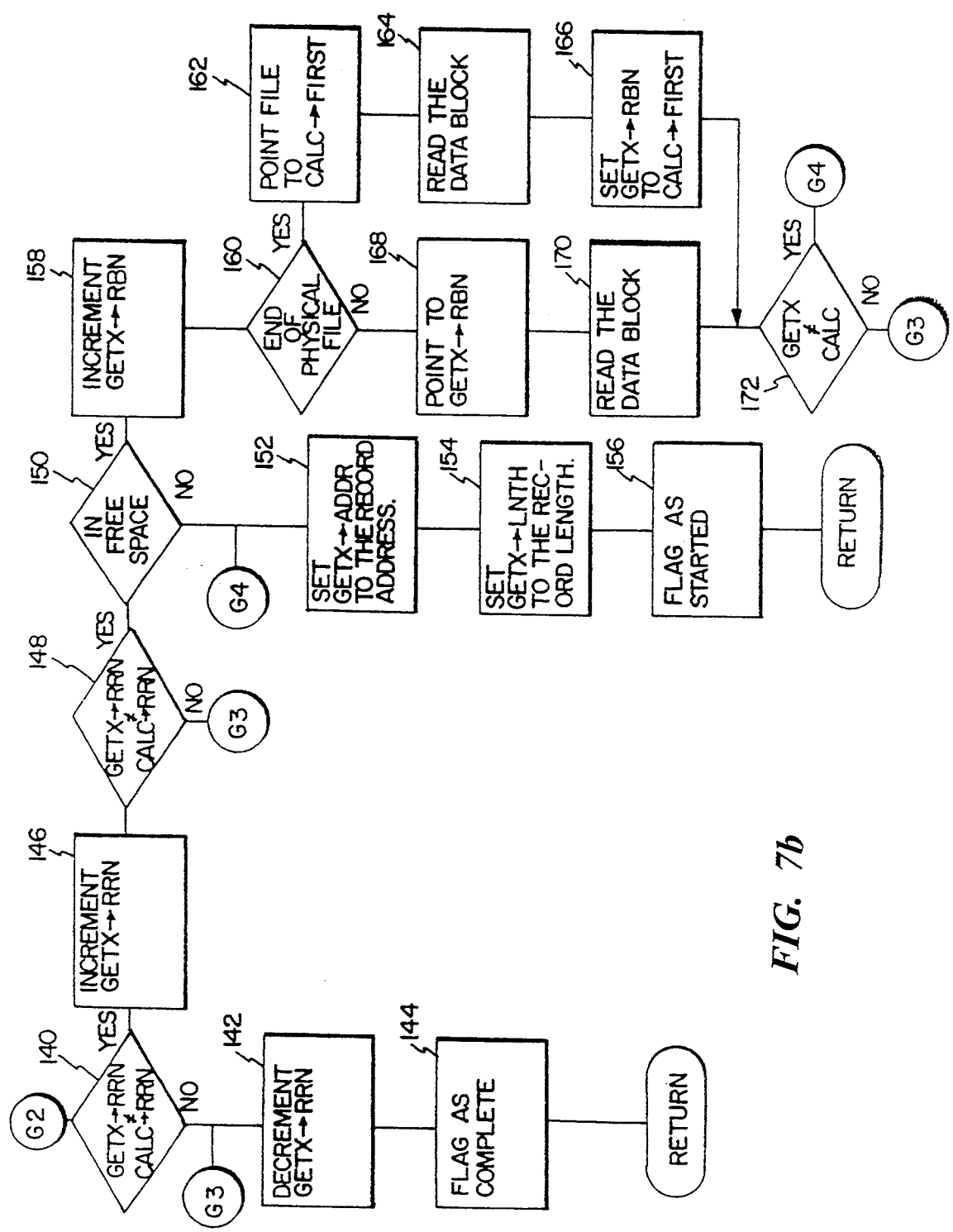

Direct Data Access Method file reading is illustrated in FIGS. 7a and 7b and described as follows. The purpose of the file read is to retrieve any data records that may have been written to the file. The intended use of this method is temporary storage of data. Storage such that a specific data record be secured to disk and need only be read if the memory image was not processed or transferred to another system. (reference back to the lock step description)

The "C" function call "ddam_getr" provides the read logic for this method and is referenced at the label "GETR" on FIG. 7a. At 100 the routine checks an internal flag to determine if the call is the first call to the routine. If so, at 102 the relative record number for the next read is set to minus one and at 104 "hd->rbn" is examined to determine if the file is initially considered "null". If this is true, at 106 "getx->rbn" is set to "calc->first", at 108 the file is pointed to "calc->first" and at 110 the first data block is read into memory.

At 112, the cycle byte is examined for binary zeros. If the cycle byte is binary zeros, the file is considered "null" and no data records exist. At 114 the status variable "util_drc" is set indicating that the read is complete and the routine returns from the call.

If the cycle byte is not binary zeros, the file is still considered "null" but it does contain some records that have not been retrieved. A check is made at 116 to see if the variables "getx->rrn" and "hd->rrn" are equal. If so the routine moves to 140 in FIG. 7b to read the record. If the variables are not equal, at 118 "getx->rrn" is incremented, the free space offset variable is updated and the routine moves back to 116.

If, at 104, the file is determined not "null", at 120 "getx->rbn" is set to "hd->rbn". This is the relative block number of the last data block read from the file. At 122 the file is then pointed to "hd->rbn" and at 124 the data block is read into memory. The routine then moves to 116 as described above.

If, at 100, this is not the first call to the routine, at 130, the file is pointed to "getx->rbn". This is required in the event that the file was repositioned during a write to the file. At 132 a check is made to determine if a write has occurred to the current block that records are being retrieved from. If not the routine moves to 140 in FIG. 7b. If so, the routine at 134 reads the block from the file, providing the latest data record information, before moving to 140.

The primary function of the logic started at 140 in FIG. 7b is to make the next record available to the application. This "availability" is an address pointer to the record in the data block memory buffer and the length of the record. It is then the responsibility of the application program to process that record as required.

At 140 the routine checks if the read and write file pointers are equal. If the file pointers are equal, the last data record has been retrieved from the file. At 142 "getx->rrn" is decremented by one and at 144 the "util_drc" status variable is set to a complete status. The routine then returns from the call.

If at 140 the file pointers are not equal, there may be more records to retrieve from the file. At 146 "getx->rrn" is incremented by one in expectation of another record. At 148, the read and write file pointers are again checked for inequality and if found equal, the last data record has been retrieved from the file and the routine moves to 142, 144 and returns.

If at 148 the file pointers are not equal, a check is made at 150 to determine if the record pointer is in the free space of the data block. If the record pointer is in the free space, at 158 "getx->rbn" is incremented by one and at 160 a check is made for the end of the physical file. If the end of the physical file has been reached, at 162 the file is pointed to "calc->first", at 164 the first data block is read into memory and at 166 "getx->rbn" is set to "calc->first".

If at 160 the end of the physical file has not been reached, at 168 the file is pointed to "getx->rbn" and at 170 the data block is read into memory. In either case, at 172 the file pointers are again checked for inequality. If the file pointers are equal the routine proceeds to 142, 144 and returns. Otherwise the routine moves to 152.

If at 150 the record pointer is not in the free space portion of the record, the routine moves to 152. At 152, "getx-addr" is set to the data block memory buffer address of the record and at 154 "getx->lnth" is set to the length of the record. At 156 the read is flagged as started and the function returns from the call.

This routine returns when each record is read and when the routine detects completion of the read or that the last record has been retrieved.

Figure 8:
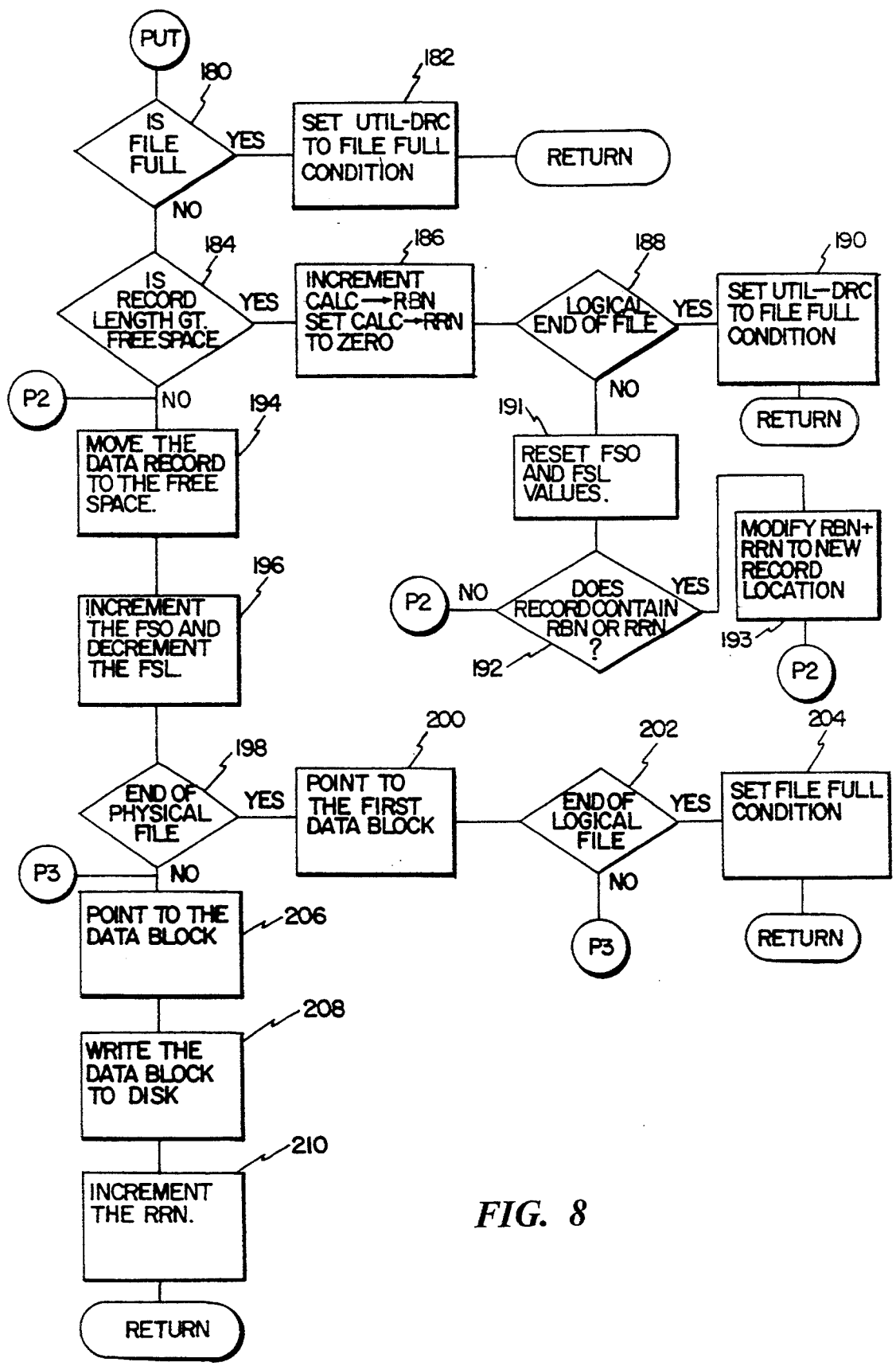
FIG. 8 is a flow diagram representative of the steps a computer goes through in writing to a direct data access file according the present invention.

Direct Data Access Method file writing is illustrated in FIG. 8 and described as follows. The label "PUT" is the entry point for the write function and the "C" function call "ddam_put" is used.

At 180 the first check determines if the file is in a full state. This is accomplished by checking "hd->full", which is stored in the file header. If the file is full, at 182 the status variable "util_drc" is set to the file full condition and the function returns from the call.

If at 180 the file is determined not to be full, at 184 the length of the data passed in the requesting write is compared with the free space in the current data block. If the length of the data is less than or equal to the amount of free space remaining, the routine moves to 194. If the length of the data is greater than the amount of free space remaining in the block, at 186 "calc->rbn" is incremented and "calc->rrn" is set to zero. This indicates a new or subsequent data block is needed and that the first relative record number will be zero.

A check is made at 188 to determine if this relative block is equal to the logical end of the file. The logical end of file is the relative block number stored in "hd->rbn", the last relative data block that was read from the file. If the logical end of file has been reached, the file has wrapped around to the location of the next record to be read and therefore there is no room to write the record to the file. At 190 the status variable is set to a file full condition, the header record updated and the function returns from the call. If at 188 the logical end of file was not reached, at 191 the free space offset and free space length values are reset in the data block memory buffer and the routine moves to 192.

At 192 a check is made to see if the current record contains a relative block or record number. If not the routine moves to 194. If the current record does contain a relative block or record number, this number is in error.

Relative block or record numbers are inserted into a record by the application code. They are used to keep applications running on different platforms in lock step. The application attaches the number, its field length and its attribute code to the record string. The number used is read from "calc->rbn" or "calc->rrn," the block and record of the next record write. This works fine as long as there is enough free space in the current block for the record to be written. However, the length of the record is not checked against the free space remaining until the record is written. This means that if enough free space does not exist, relative block and record numbers within the record must be modified to reflect the new block and record location. This is done at 193. The routine then moves to 194.

At 194 the data record is moved to the free space in the data block memory buffer. At 196, the free space offset is incremented by the length of the data record and the free space length is decremented by the length of the data record. This is in expectation of the next write to the file. A check is made at 198 to determine if the end of the physical file has been reached. This can occur as "calc->rbn" is incremented. If the physical end of the file has not been reached, the routine moves to 206. If the physical end of the file has been reached, at 200 the file is pointed to the first data block. A check is made at 202 to determine if this is the logical end of file. If not, the routine moves to 206. If it is the logical end of file, at 204 the status variable is set to the file full condition and the function returns from the call.

At 206 the routine points the file to the current data block contained in "calc->rbn". This is required due to the fact that reading and writing can be interleaved to the same file. At 208 the data block is then written to disk. At 210 the relative record number "calc->rrn" is incremented and the function returns from the call.

The record manipulation primitives and direct data access primitives are all that are required to build self-contained data collection systems. A system built on these primitives is capable of storing data to nonvolatile memory as it is acquired and retrieving and examining that data at a later date. The use of nonvolatile memory provides high data integrity in the handling of data. Addition of the proper communication primitives allows transfer of captured data to other processor platforms.

These primitives could be used in systems outside of transaction processing. In the field of manufacturing, the relative block number and the relative record number could be used to track the discrete events of a robotic manipulation in order to recover from unforeseen events such as power failures.

A much more complex processing system can be constructed when the record manipulation and direct data access primitives are combined with an index data access primitive. The Index Data Access (IDA) Method is a simplified method for organized storage and retrieval of data records via an index of keys. Each key in the index is a meaningful value associated with a data record. The key is usually also contained in the data record.

All keys are fixed to a specified length and all data blocks are fixed to a specified length on a per file basis. For each data block one key entry exists in the index. The relative position of a key in the index determines the relative position of the data record on disk.

The IDA primitives are designed such that a copy of the complete index is stored in memory. This reduces program complexity and the search time needed to scan the index. This also limits the index size to a portion of system memory. However, the intended use of the method is for smaller distributed systems and as memory becomes less costly the limitation becomes less significant.

Overall processing time is reduced to a minimum for the fundamental functions of an index access method. The index is updated on disk only after it is changed in memory. Only the disk sector containing the portion changed is written back to disk. If an index entry spans a sector, both sectors are written to disk. This assists in reducing disk processing time.

Disk processing time is reduced on a "record delete" function by flagging the control byte of the key in the index, and again only writing that portion of the index back to disk. The "record add" function requires writing both the index portion and the data record to disk. The "record update" function requires reading the data record into memory, changing it, and writing the data record back to disk.

The "record replace" function requires only writing the data record to disk. Reading the record is of no interest on a "replace" function.

The IDA method reduces the possibility of file corruption during abnormal program termination. During a "record add" function a data block is written to disk before the updated index portion. During a "record delete" function only the control byte of the index key entry is changed (not the actual key). Then only that portion of the index is written to disk.

With appropriate structure addressing more than one index access file can be utilized in an application.

A file is allocated and formatted for use as an Index Data Access Method file. The specifications for allocation are as follows:

- Disk sector size: This is generally the smallest subdivision of a disk file that the operating system will read or write. The file allocation size is based on multiples of the sector size.
- Number of data blocks or records: This is the perceived total number of application records that the file will hold. Application record and data block record are considered to be the same.
- Size of the data block: This is the size of the record data block in bytes, required by the application. The size of each data block will be rounded up to multiples of the sector size. All data blocks are allocated to the same size for a specified file.
- Length of the key field in bytes: Each record on the file is located by a unique key. This key is an application specific data item that is meaningful in relation to the record.

From the above specifications the size of the file is determined. The block size is rounded up to a multiple of the given sector size. The total block size is the individual block size times the number of records. The index is structured such that a one byte control field is prefixed to each key field. Also, one additional key field is allocated to indicate the end of the index. This end of index marker is a key field and control byte set to binary ones. The size of the index is the key size plus the control byte, times the number of records plus one (for the end of index) and rounded up to a multiple of the given sector size.

In addition to the index and data blocks a header record is required for each file. This header record is allocated as the size of one sector.

Figure 5:
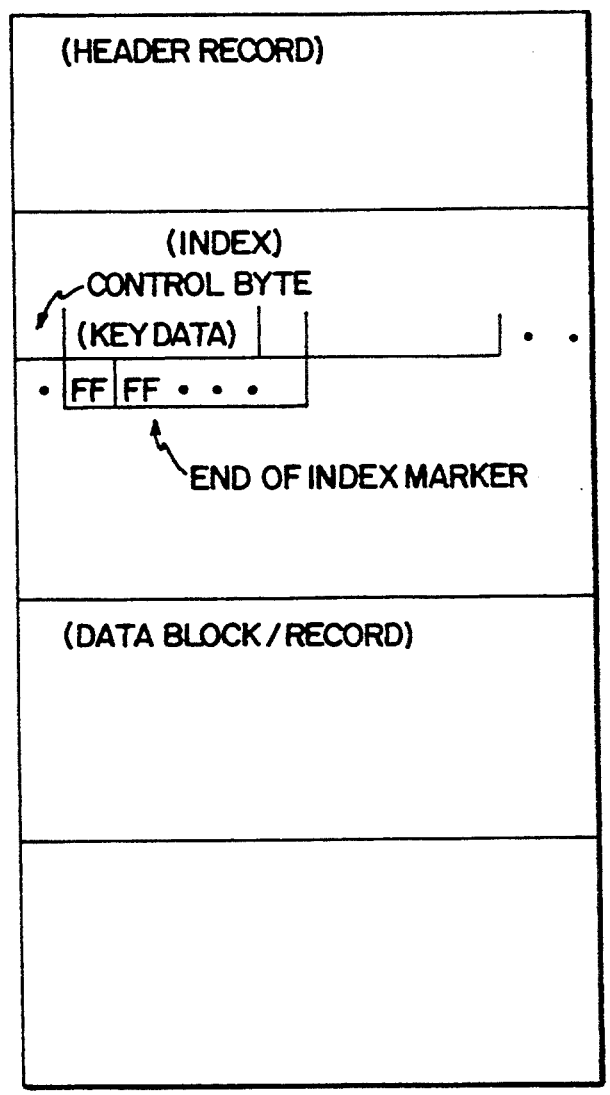
FIG. 5 is a diagram of a indexed access file according to the present invention.

The total byte size of the file is a summation of the above. When the file is created the index is formatted with all key fields initialized to binary zeros, and key field control bytes initialized to an "open" status. Also, all data blocks are initialized to binary zeros. A given file can be represented by the diagram shown in FIG. 5.

The file header record contains the file specification information and is formatted as follows:

- Two byte unsigned integer for the header record size in bytes;
- Two byte unsigned integer for the sector size in bytes;
- Two byte unsigned integer for the index size in bytes;
- Two byte unsigned integer for the key size in bytes; (key size plus one)
- Two byte unsigned integer for the data block size in bytes;
- Two byte unsigned integer for the number of data blocks;
- Two byte unsigned integer for the file full flag;
- Two byte unsigned integer for the optional application identification;
- Seven byte field for the file creation date stored as unsigned hexadecimal values (YYYYMMDDHHMMSS);
- Open space for the remainder of the header record.

In the preferred embodiment, a utility program is provided for the allocation and formatting of an Index Access Method file. A data structure of file information is partially created at application initialization. This structure is also referenced and updated during processing and contains the following:

Address pointer to the file header record in memory;
Address pointer to the specific record;
Address pointer to the data block memory buffer;
Address pointer to the specific index disk sector;
Address pointer to the data block cycle byte;
Address pointer to a search key field;
Address pointer to the free space length value of a data block;
Address pointer to the free space offset value of a data block;
Address pointer to the index memory buffer;
Address pointer to the key of interest in the index memory buffer;
Address pointer to end of index marker;
Two byte unsigned integer for the length of the record;
Two byte unsigned integer for the relative data record number;
Two byte unsigned integer for the count of open index entries;
Two byte unsigned integer for the relative record in a data block;

At application program initialization the first 512 bytes of the file header record are read into a temporary buffer and the file specification information is accessed to dynamically allocate system memory for the file processing. The initialization for file processing is explained next.

At initialization the file is opened and the first 512 bytes of the header record are read into a temporary buffer. The actual size of the header record is determined, memory dynamically allocated and the address is stored in the address pointer to the file header record in memory. The total header record is read into that memory. The size of the index is determined from the header record, memory is dynamically allocated and the address is stored in the address pointer to the index memory buffer. The size of a data block is determined from the header record, memory is dynamically allocated and the address is stored in the address pointer to the data block memory buffer. The index is then read into the appropriate memory buffer. All index access is from this memory buffer for performance.

Once the index is read into memory, the data memory block buffer is cleared to binary zeros. The address pointer to the end of index marker is established, and the pointer to the key of interest in the index memory buffer is set to the address of the first key in the index memory buffer.

In the preferred embodiment, a "C" function call (idam_int) is provided for this initialization and a "C" function call (idam_finish) is provided to de-allocate system memory at application termination.

The fundamental data processing functions of the Index Data Access Method provide addition or replacement of data records, deletion of data records and reading of data records. To add or replace a data record implies writing the data record to disk. This also further implies that on an add condition the index be updated on disk. The add condition, by design, will write the data record to disk first, then update the index on disk. A replace condition does not require the index to be updated. This approach provides a minimal amount of data loss and disk file corruption in the event of a hardware or software failure during an update to the file.

To delete using the IDA method the control byte for the key of interest is charged to an "open" status. The index is then updated on disk. The data record is of no interest.

The specific function calls provided with the Index Data Access Method are next described. To add a record to the file the application program has to determine if an open index entry exists. This is accomplished with the "C" function call "idam_find_open". This call starts at the beginning of the index in memory and scans to the end of index marker. During the scan the relative data record number is updated and the pointer to the key of interest is updated. Each index entry control byte is examined for an "open" status and the first occurrence of an "open index entry causes the function to return to the application.

If no "open" index entries were found the status variable (util_irc) is set to IDAM_NO_OP. If an "open" index entry was found the status variable is set to IDAM_OK. It is the responsibility of the application program to check this value on completion of the call.

At the completion of the call, the pointer to the key of interest is available to the application program. It is the responsibility of the application program to build the key and to build the application data in the data record buffer. The pointer to the key of interest points to the control byte. It is the responsibility of the application program to set this byte to the appropriate value. In this example the value is IDAM_INUSE. The application program may then use the "C" function "idam_build_key". This function will move the application key data to the index entry. The length of the move is derived from the key size in the file header record.

The next call to be issued is "idam_write_data". This call will write the data record buffer to the file at the relative data record number. The relative data record number was established during the "idam_find_open" call. The index will optionally be written after the data record. This index write function is specified as one of the parameters to the call.

In the preferred embodiment this option is used to force the write of the index on each "add" data write. This will assist in maintaining file integrity.

To replace an existing data record on the file the application program has to first determine if the record key exists. This is accomplished with the "C" function call "idam_find_equal". This function expects the search key field to contain the key value to search for. It is the responsibility of the application program to build the search key and set the search key pointer in the structure of file information.

This function call starts at the beginning of the index in memory and scans to the end of index marker. During the scan the relative data record number is updated and the pointer to the key of interest is updated. Each index entry is compared to the search key and the first occurrence of an "equal" condition causes the function to return to the application. If no "equal" condition occurs the status variable (util_irc) is set to IDAM_NO_EQ. If an "equal" index entry was found the status variable is set to IDAM_OK. It is the responsibility of the application program to check this value on completion of the call.

The next call to be issued is "idam_write_data". This call will write the data record buffer to the file at the relative data record number. The relative data record number was established during the previous call. The index does not have to be written and the function call should be made without the write index option.

To delete an existing data record the application must determine if the record key exists. The "idam_find_equal" is used again. If an "equal" condition is determined, it is the responsibility of the application program to update the control byte of the key to "IDAM_OPEN". The "IDAM_OPEN" status in a control byte signifies that this index entry may be used again.

The application program must then write the index to the disk. This is accomplished with the "C" function call "idam_write_index". This call will determine the specific sector that the updated key is in. The file is then positioned to this location and the specific sector of the index is written. It is the responsibility of the application program to examine the "util_irc" status variable on completion of the call.

To read an existing data record the application must determine if the record key exists. The "idam_find_equal" is used again. If an "equal" condition is determined, the application program must use the "C" function call "idam_read_data". This function call will read the appropriate data record into the data block memory buffer. The application program may then access the data via the pointer to the data block memory buffer.

Other ancillary functions for the index data access method are described. A count of all "open" index entries can be determined by using the "C" function call "idam_count_open".

The index can be cleared or each entry control byte set to "IDAM_0PEN" by using the "C" function call "idam_clear". This call will write the index to disk for each entry.

Each "in use" or active key can be returned to an application program by using the "C" function call "idam_get_keys". This call is intended to be used iteratively as it will return each time an "in use" key is detected.

Each "open" key can be returned to an application program by using the "C" function call "idam_get_key_op". This call is intended to be used iteratively as it will return each time an "open" key is detected.

By design the Index Data Access method does not destroy any key field data or data block data during delete or clear functions. Only the index entry control byte is changed and the index written back to disk. This will provide a measure of recovery in the event that an application program deletes or clears index entries inadvertently. The "C" function call "idam_get_key_op" could be used and an application program could examine the key, the data record, or change the index entry control byte.

The Index Data Access Method can store a block of data in essentially the same format as the Direct Data Access Method. This provides a mechanism to store variable length records in an Index Data Access Method data block and access the data block with a key.

In order to perform this function, IDA primitives are provided. In the preferred embodiment at the protocol level the primitives are provided as source code in "C" and parts of the utility level are supplied in assembly language. The source code is then compiled in a library and linked with the application code.

Format and initialization functions are required. If the data block is considered "new" or "unknown", it must be formatted. Initialization is required before the first write access to a data block. Initialization establishes the location for writing the next record.

To format a "new" or "unknown" data block the "C" function call "idam_fmtn" is used. The data block is cleared to binary zeros. A cycle byte, free space length and offset values are established in the data block memory buffer. The cycle byte is present only to maintain format compatibility with the Direct Data Access Method. The free space length is the remaining number of bytes in the data block available for record storage. The free space offset is the starting location in the data block of the free space. The above values are stored in the structure of file information and in the data block memory buffer. The values occupy the first four bytes of the data block in this implementation.

To initialize the environment before the first "write" access the "C" function "idam_intb" is used. This function call will establish the free space length and offset values in the structure of file information from the data block memory buffer. The data block in memory could be a "newly" created data block or a data block that has been read from disk.

To add a record to a data block the "C" function "idam_addt" is used. This function call will move a record to the data block provided there is enough free space in the data block. The data block will then be optionally written to disk. It is the responsibility of the application program to examine the "util_irc" status variable on completion of the call.

To retrieve a record from a data block the "C" function "idam_gets" is used. This function searches the data block for a specific record and sets a status variable accordingly. The address pointer to the specific record and the record length are also updated. It is the responsibility of the application program to examine the "util_irc" status variable on completion of the call.

The methodology of the present invention can be used to connect processing platforms from hand held calculators to mainframes and has applications ranging from transaction processing to manufacturing. Although the present invention has been described with reference to the preferred embodiments, those skilled in the art will recognize that changes may be made in form and detail without departing from the spirit and scope of the invention.

What is claimed is:

1. A transaction processing method for use in a transaction processing system comprising a first processor for processing a plurality of orders, a second processor connected to the first processor, and a controller connected to the second processor, wherein the second processor receives, stores, and controls execution of a transaction associated with the one of plurality of orders, and formats transaction results resulting from the transaction execution, and wherein the controller executes the transaction, the method comprising the steps of:

entering a first order at the first processor;
    building a first order record representative of the first order, wherein the first order record comprises:
        a record identifier identifying a record type;
        a first data structure, the first data structure comprising:
            a first data field length;
            a first data field, wherein the first data field contains first data; and
            a first attribute code identifying the first data field; and a second data structure, the second data structure comprising:
a second data field length;
a second data field, wherein the second data field contains second data; and
a second attribute code indentfying the second data field;
transferring the first order record from the first processor to the second processor;
storing the firs order record in the second processor with other order records received from the first processor;
retrieving the first order record;
building a controller record comprising a data structure derived from at least one data structure from the first order record;
transferring the controller record to the controller,
executing the first order at the controller;
reporting, from the controller to the second processor; transaction results of the first order execution; and
formatting the traction results as one or more transaction result records, wherein each of the transaction results records comprise:
a record indentifier indentfying a record type;
a data structure, the data structure comprising:
a data field length;
a data field, wherein the data field contains transaction data; and
an attribute code identifying the data field;
wherein the step of formating the transaction results is performed in the second processor.

2. The transaction processing method according to claim 1, wherein the step of building the controller record comprises the steps of:
scanning the first order record to locate the first data structure; and
storing the first data structure in the controller record.

3. The transaction processing method according to claim 1, wherein the step of executing the first order at the controller comprise the steps of:
scanning the controller record to locate
the first data and the first data attribute; and
processing the first order based on the first data and the first data attribute.

4. The transaction processing method according to claim 3, wherein the step of processing the first order at the controller comprises the step of:
measuring a quality of material transferred.

5. The transaction processing method according to claim 1, further comprising the step of:
transferring the transaction results records to the first processor.

6. The transaction processing method according to claim 1, wherein the step of executing the first order at the controller comprises the step of:
measuring a quantity of material transferred.

7. A distributed data processing system for coordinating a plurality of transaction, including a first transaction involving a transfer of a quality of material, the system comprising:
an order generation computer including order entry means for entering a first transaction order, including data needed to execute the first transaction, and order formatting means for creating an order record from the first transaction order, wherein the order record comprises a record identifier and a plurality of data fields, each data field comprising a data field length, data and a data field attribute code indentifing the data field and wherein one of the plurality of data fields includes an order number;
a transaction processing computer, connected to the order generation computer, for processing the order record, the transaction processing computer including:
nonvolatile memory; and
order control means, connected to the nonvolatile memory and the order generation computer, for receiving from the order generation computer the order record, for saving the order record to a location in the nonvolatile memory, the recording the order number associated with the order record, and for recording the location of the order record; and
a controller connected to the order control means, wherein the controller comprises means for receiving the order from the order control means, order executing means for executing the first transaction data formatting means for creating a transaction data record, wherein the order executing means comprise measurement means for measuring the quality of material transferred and wherein the transaction data record comprises a record indentifier and a transaction data field, the transaction data field comprising a data field length, transaction data captured by the measurement means and a data field attribute code indentifying the transaction data field;
wherein the transaction processing computer further comprises transaction data control means, connected to the nonvolatile memory and the controller, for receiving the transaction data record from the controller, for storing the transaction data record to the nonvolatile memory and for transferring the transaction data record to the order generation computer.

8. The system according to claim 7 wherein the transaction data control means includes data transfer means for monitoring transfer of the transaction data record to the order generation means and for requesting from the order generation means the record indentifier associated with the transaction data record transferred to the order generation means 9. The system according to claim 8 wherein the transaction data record is stored within a block of nonvolatile memory, wherein the block has a block number and wherein the transaction data record transferred to said order generation means is identified by the block number and a relative record number.

10. The system according to claim 9, wherein the transaction data control means further includes processor memory and block image means for maintaining an image of the block in the processor memory, for writing the transaction data record to the block image and for writing the block image to the nonvolatile memory.

* * * * *

UNITED STATES PATENT AND TRADEMARK OFFICE
CERTIFICATE OF CORRECTION

PATENT NO. : 5,438,509

DATED : August 1, 1995

INVENTOR(S) : Donald J. Heffron

It is certified that error appears in the above-indentified patent and that said Letters Patent is hereby corrected as shown below:

At Column 1 Line 9 please delete "1. Filed" and insert --1 Field-- therefor.

Column 1 Line 14 please delete "2." and insert --2-- therefor.

Column 1 Line 16 please delete "the past be" and insert --the past been -- therefor.

Column 4 Line 17 please delete "can be access" and insert --can be accessed-- therefor.

Column 8 Line 22 please delete "attribute-only field" and insert --attribute-only fields-- therefor.

Column 12 Line 38 please delete "the file access" and insert --at file access-- therefor.

Column 20 Line 4 please delete "interest is charged" and insert-- interest is changed-- therefor.

Column 20 Line 17 please delete "an "open index entry" and insert --an "open" index entry--therefor.

UNITED STATES PATENT AND TRADEMARK OFFICE
CERTIFICATE OF CORRECTION

PATENT NO. : 5,438,509
DATED : August 1, 1995
INVENTOR(S) : Donald J. Heffron

It is certified that error appears in the above-indentified patent and that said Letters Patent is hereby corrected as shown below:

At Column 21 Line 33 please delete "IDAM_0PEN" and insert --IDAM_OPEN-- therefor.

Column 23 Line 10 please delete "firs" and insert --first-- therefor.

Column 23 Line 17 please delete "controller," and insert --controller;-- therefor.

Column 23 Line 20 please delete "processor;" and insert --processor,-- therefor.

At Column 23 Line 22 please delete "traction" and insert --transaction-- therefor.

Column 23 Line 42 please delete "the controller comprise" and insert --the controller comprises-- therefor.

Column 23 Line 50 please delete "quality" and insert --quantity-- therefor.

Column 23 Line 60 please delete "transaction" and insert --transactions-- therefor. (1st. occurrence)

Column 23 Line 61 please delete "quality" and insert --quantity-- therefor.

Column 24 Line 7 please delete "indentifing" and insert --identifying-- therefor.

Column 24 Line 19 please delete "the recording" and insert --for recording-- therefor.

UNITED STATES PATENT AND TRADEMARK OFFICE
CERTIFICATE OF CORRECTION

PATENT NO. : 5,438,509
DATED : August 1, 1995
INVENTOR(S) : Donald J. Heffron

It is certified that error appears in the above-indentified patent and that said Letters Patent is hereby corrected as shown below:

At Column 24 Line 25 please delete "order from" and insert --order record from-- therefor.

Column 24 Line 26 please delete "transaction" and insert --transaction, and transaction-- therefor.

Column 24 Line 30 please delete "quality" and insert --quantity-- therefor.

Column 24 Line 45 please delete "according to claim 7" and insert --according to claim 7,-- therefor.

Column 24 Line 52 please delete "according to claim 8" and insert --according to claim 8,-- therefor.

Column 24 Line 55 please delete "said" and insert --the-- therefor.

Signed and Sealed this

Eighth Day of October, 1996

Attest:

BRUCE LEHMAN

Attesting Officer     Commissioner of Patents and Trademarks